United States Patent
Takemoto et al.

(10) Patent No.: US 7,046,960 B2
(45) Date of Patent: May 16, 2006

(54) RELAY APPARATUS

(75) Inventors: Makoto Takemoto, Yokohama (JP);
Katsuyuki Kawase, Sagamihara (JP);
Tetsu Takase, Yokohama (JP); **Jun
Shibata**, Yokohama (JP)

(73) Assignee: **Matsushita Electric Industrial Co.,
Ltd.**, Osaka (JP)

( * ) Notice: Subject to any disclaimer, the term of this patent is extended or adjusted under 35 U.S.C. 154(b) by 575 days.

(21) Appl. No.: 10/001,759

(22) Filed: Oct. 24, 2001

(65) Prior Publication Data

US 2002/0127968 A1 Sep. 12, 2002

(30) Foreign Application Priority Data

Mar. 6, 2001 (JP) .................... P 2001-062228

(51) Int. Cl.
*H04B 7/14* (2006.01)

(52) U.S. Cl. .................. 455/24; 455/189.1; 455/191.1; 455/196.1; 455/7; 455/12.1; 455/13.1

(58) Field of Classification Search ............... 455/12.1, 455/13.1, 24, 189.1, 191.1, 196.1, 7
See application file for complete search history.

(56) References Cited

U.S. PATENT DOCUMENTS

| | | | |
|---|---|---|---|
| 3,699,444 A * | 10/1972 | Ghose et al. ............ | 455/79 |
| 3,916,320 A * | 10/1975 | Roll et al. ............... | 455/304 |
| 4,776,032 A | 10/1988 | Odate et al. | |
| 4,952,193 A * | 8/1990 | Talwar ..................... | 455/63.1 |
| 5,396,655 A * | 3/1995 | Saad ........................ | 455/295 |
| 5,576,659 A | 11/1996 | Kenington et al. | |
| 2005/0069063 A1* | 3/2005 | Waltho et al. .......... | 375/346 |

FOREIGN PATENT DOCUMENTS

| | | | |
|---|---|---|---|
| EP | 0 851 606 A2 | | 7/1998 |
| EP | EP905914 A2 * | | 3/1999 |
| JP | 02043883 | * | 2/1990 |
| JP | 11112156 | * | 4/1999 |
| JP | 11112400 | * | 4/1999 |
| JP | 11-355160 | | 12/1999 |
| JP | 2000022615 | * | 1/2000 |

* cited by examiner

*Primary Examiner*—Edan Orgad
*Assistant Examiner*—Sujatha Sharma
(74) *Attorney, Agent, or Firm*—Pearne & Gordon LLP (57) ABSTRACT

While a spectrum waveform of an output signal from a subtracter (207) is visibly monitored, an operator controls a variable phases shifter (208) based upon a second control signal (CL2) so that a shape of a spectrum waveform of an output signal from a subtracter (207) is approximated to a spectrum waveform of a desirable wave to change a phase of a local oscillation frequency signal from a local oscillator (206). As a result, a phase of a duplicated loop signal is changed. Also, the operator controls a variable attenuator (209) based upon a first control signal (CL1) so that a shape of this spectrum waveform is approximated to a spectrum waveform of a desirable wave (20) to change a signal level of the duplicated loop signal.

5 Claims, 5 Drawing Sheets

RELAY APPARATUS

BACKGROUND OF THE INVENTION

The present invention is generally related to a relay apparatus equipped with a function capable of canceling interference from a transmission antenna to a reception antenna, that is so called a loop operations of signals between a reception antenna and a transmission antenna. More specifically, the present invention is directed to such a relay apparatus capable of firmly removing loop waves contained in received input signals by correcting amplitude errors and phase errors.

The Integrated Services Digital Broadcasting-Terrestrial (ISDB-T) system is directed to such a TV system which has been developed in order to provide the HDTV (High Definition Television) broadcasting services for fixed receiver sites, and also the broadcasting services for the mobile receiver sites, while utilizing the frequency band of the presently-operated ground-based analog television broadcasting system, such as VHS or UHF. This ISDB-T system employs the OFDM (Orthogonal Frequency Division Multiplexing) system as the transmission system. This OFDM system owns the following various merits. That is, not only this OFDM system can be hardly adversely influenced by multipath interference, but also the modulation method can be changed every sub-carrier, and furthermore, the SFN (Single Frequency Network) can be established. In this case, this SFN corresponds to such a system that the same program can be relayed/transferred in the same frequency (channel). Since the SFN can provide the broadcasting services with employment of the narrow-band frequency, the frequency resource can be effectively utilized. Since very large numbers of the ground-based analog television broadcasting channels have already been utilized, there are many areas where continuous and broad frequency bands cannot be newly secured. Under such difficult conditions, in order to conduct the above-described ISDB-T system, it is preferable to establish such a broadcasting system with employment of the SFN, since this SFN broadcasting system may be practically operated in connection with the presently available ground-based analog television broadcasting system.

However, in the case that the broadcasting system using the SFN is established, there is a problem such as a so-called "loop phenomenon", since broadcasting signals are transmitted/received by using the same frequency in relay stations. In this loop phenomenon, broadcasting signals having the same frequency which are transmitted from a transmission antenna are returned to a reception antenna in a loop manner. As a consequence, this loop phenomenon may not only cause signal transfer qualities to be deteriorated, but also may induce oscillations in such a case that coupling amounts between transmission antennas and reception antennas are large, so that retransmissions of broadcasting signals cannot be carried out.

Figure 6:
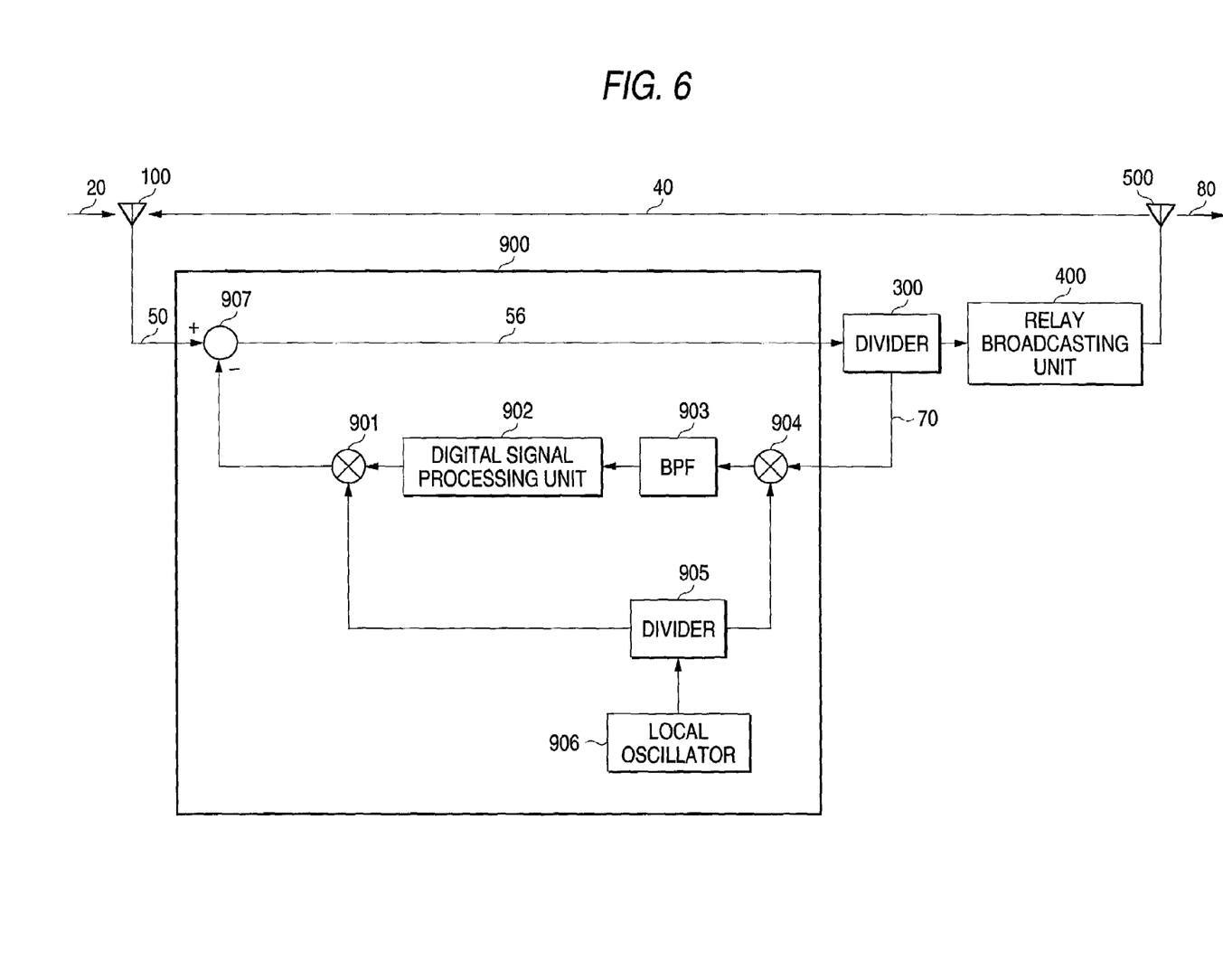
FIG. 6 is a structural diagram for indicating the conventional relay apparatus.

To solve such a problem, Japanese Patent Publication No. Hei. 11-355160 has proposed the loop canceller capable of canceling the signal loop occurred between the transmission antenna and the reception antenna of the relay apparatus operated in the SFN. FIG. 6 shows a structural diagram of this conventional relay apparatus. In the relay apparatus of this conventional loop canceller, based upon the reference signal 70 which is derived from the input side of the relay broadcasting unit 400 and then divided from the divider 300, the digital signal processing unit 902 employed in the loop canceller 900 produces such a duplicated loop signal having the transmission characteristic equal to the transmission characteristic of the loop transfer system established between the transmission antenna 500 and the reception antenna 100 provided in the relay apparatus. Then, the subtracter 907 subtracts the duplicated loop signal which is produced in the digital signal processing unit 902 from the received input signal 50 of the relay apparatus. This received input signal 50 contains the loop signal derived from the transmission side. As a result, the signal loop operations occurred between the transmission antenna 500 and the reception antenna 100 may be canceled.

However, in the above-explained conventional relay apparatus, while the digital signal processing unit 902 converts the analog signal into the digital signal and thereafter executes the signal process operation, the quantization error may occur when the quantizing operation of this analog-to-digital conversion is carried out. For instance, in a 4-bit A/D converter, precision of resolution becomes $2^4=16$. In the case that numeral values defined from 0 to 1 are expressed by 4 bits, these numerals cannot be expressed only by an integral multiple of $1/16=0.0625$. As a result, when such a numeral value of 0.07 is repressed by 4 bits, this numeral value is expressed by either 0.0625 or 0.125 ($=0.0625\times2$), so that such an error of either 0.075 or 0.055 may be produced with respect to 0.07.

Since there are such a quantization error caused by the quantizing operation of the analog-to-digital conversion by the digital signal processing unit 902, the delays caused by the signal processing operation, and other factors, the duplicated loop signal which is produced by the digital signal processing unit 902 contains either the amplitude error or the phase error. Thus, since both the amplitude and the phase of the loop signal derived from the transmission antenna 500 cannot be completely made coincident with both the amplitude and the phase of the duplicated loop signal, the loop wave 40 derived from the received input signal 50 cannot be firmly removed, so that the problem such as the deteriorations in the signal transmission qualities could not be completely solved.

SUMMARY OF THE INVENTION

The present invention has been made to solve the above-explained problems, and therefore, has an object to provide such a relay apparatus capable of firmly removing a loop wave contained in a received input signal by correcting both an amplitude error and a phase error, which are contained in a duplicated loop signal, and also capable of maintaining transmission qualities under better condition.

To solve the above-described problems, according to a first aspect of the present invention, are lay apparatus equipped with a function capable of canceling loop operation of a signal between a reception antenna and a transmission antenna, comprising: subtracting unit for subtracting a duplicated loop signal from a received input signal which is produced by containing loop waves in a desirable wave received via the reception antenna; relay broadcasting unit for inputting the output signal of the subtracting unit and for outputting a broadcasting signal; signal processing unit for producing the duplicated loop signal based upon any one of the input signal of said relay broadcasting unit and the broadcasting signal outputted from the relay broadcasting unit; and variable attenuating unit for varying a signal level of the duplicated loop signal which is produced by the signal processing unit; wherein: the variable attenuating unit adjusts the signal level of the duplicated loop signal in such a manner that an amplitude error of the duplicated loop signal is corrected.

According to the second aspect of the invention, a relay apparatus comprising: subtracting unit for subtracting a duplicated loop signal from a received input signal which is produced by containing loop waves in a desirable wave received via the reception antenna; relay broadcasting unit for inputting the output signal of the subtracting unit and for outputting a broadcasting signal; signal processing unit for producing the duplicated loop signal based upon any one of the input signal of the relay broadcasting unit and the broadcasting signal outputted from the relay broadcasting unit; and variable phase shifting unit for varying a phase of the duplicated loop signal which is produced by the signal processing unit; wherein: the variable phase shifting unit adjusts the phase of the duplicated loop signal in such a manner that a phase error of the duplicated loop signal is corrected.

Preferably, the relay apparatus according to the second aspect of the invention further comprises: local oscillation unit for producing a local oscillation frequency signal; dividing unit for dividing the local oscillation frequency signal; first frequency converting unit for frequency-converting any one of the wireless frequency signals corresponding to the input signal and the output signal of the relay broadcasting unit into an intermediate frequency signal by using one of the local oscillation frequency signals divided by the dividing unit; and second frequency converting unit for frequency-converting the duplicated loop signal which is produced by the signal processing unit into a wireless frequency signal by using the other local oscillation frequency signal divided by the dividing unit; and wherein: the variable phase shifting unit is connected to any one output side, or both output sides of the dividing unit.

Also, the relay apparatus according to the first aspect of the invention further comprises: signal level measuring unit for measuring a signal level of the output of the subtracting unit; and wherein: the variable attenuating unit adjusts the signal level of the duplicated loop signal in such a manner that the signal level of the output of the subtracting unit, which is measured by said signal level measuring unit, becomes a predetermined signal level.

Further, the relay apparatus according to according the second aspect of the invention further comprises: signal level measuring unit for measuring a signal level of the output of the subtracting unit; and wherein: the variable phase shifting unit adjusts the phase of the duplicated loop signal in such a manner that the signal level of the output of the subtracting unit, which is measured by the signal level measuring unit, becomes a predetermined signal level.

Also, the relay apparatus according to the first aspect of the invention further comprises: receiving/demodulating unit for receiving the broadcasting signal outputted from the relay broadcasting unit and for demodulating the received broadcasting signal; and error rate measuring unit for measuring an error rate of the broadcasting signal which is demodulated by the receiving/demodulating unit; and wherein: the variable attenuating unit adjusts the signal level of the duplicated loop signal in such a manner that the error rate of the broadcasting signal measured by said error rate measuring unit becomes lower than, or equal to a predetermined value.

Furthermore, the relay apparatus according to the second aspect further comprises: receiving/demodulating unit for receiving the broadcasting signal outputted from the relay broadcasting unit and for demodulating the received broadcasting signal; and error rate measuring unit for measuring an error rate of the broadcasting signal which is demodulated by the receiving/demodulating unit; and wherein: the variable phase shifting unit adjusts the phase of the duplicated loop signal in such a manner that the error rate of the broadcasting signal measured by the error rate measuring unit becomes lower than, or equal to a predetermined value.

In the relay apparatus according to the first aspect the present invention, the duplicated loop signal is produced by the signal processing unit based upon any one of the input signal and the output signal of the relay broadcasting unit which enters thereinto the output signal of the subtracting unit and outputs the broadcasting signal, and then, the subtracting unit subtracts the duplicated loop signal produced by the signal processing unit from the received input signal which is obtained by containing the loop waves in the desirable wave received via the reception antenna. At this time, the variable attenuating unit adjusts the signal level of the duplicated loop signal in such a manner that the amplitude error of the duplicated loop signal is corrected.

In this case, the amplitude error corresponds to such an error which is caused by the quantization error and the like, which are produced when the analog-to-digital converting operation is carried out prior to the signal process operation of the signal processing unit. As previously described, since the variable attenuation unit varies the signal level of the duplicated loop signal to adjust this signal level in such a manner that the amplitude error of the duplicated loop signal is corrected, the loop waves contained in the received input signal can be firmly removed, and also, the transmission qualities can be maintained under better conditions.

In the relay apparatus according to the second aspect of the present invention, the duplicated loop signal is produced by the signal processing unit based upon any one of the input signal and the output signal of the relay broadcasting unit which enters thereinto the output signal of the subtracting unit and outputs the broadcasting signal, and thereafter, the subtracting unit subtracts the duplicated loop signal produced by the signal processing unit from the received input signal which is obtained by containing the loop waves in the desirable wave received via the reception antenna. At this time, the variable phase shifting unit adjusts the phase of the duplicated loop signal in such a manner that the phase error of the duplicated loop signal is corrected.

More specifically, in the relay apparatus, the local oscillation unit produces the local oscillation frequency signal, the dividing unit divides the local oscillation frequency signal, the first frequency converting unit frequency-converts any one of the wireless frequency signals corresponding to the input signal and the output signal of the relay broadcasting unit into the intermediate frequency signal by using one of the local oscillation frequency signals divided by the dividing unit; and the second frequency converting unit frequency-converts the duplicated loop signal which is produced by the signal processing unit into the wireless frequency signal by using the other local oscillation frequency signal divided by the dividing unit. Then, the variable phase shifting unit is connected to any one output side, or both output sides of the dividing unit.

In this case, the phase error corresponds to such an error which is caused by the signal delays and the like, which are produced by the signal processing operation by the signal processing unit. As previously described, since the variable phase unit varies the phase of the duplicated loop signal to adjust this phase in such a manner that the phase error of the duplicated loop signal is corrected, the loop waves contained in the received input signal can be firmly removed, and also, the transmission qualities can be maintained under better conditions.

Also, more specifically, in the relay apparatus, the signal level measuring unit measures the signal level of the output of the subtracting unit; and the variable attenuating unit adjusts the signal level of the duplicated loop signal in such a manner that the signal level of the output of the subtracting unit, which is measured by the signal level measuring unit, becomes a predetermined signal level.

In this case, the signal level which is measured by the signal level measuring unit corresponds to, for example, a power level of a signal outputted from the subtracting unit. Concretely speaking, this signal level may be visibly monitored based upon a frequency division of a signal, namely, a spectrum waveform. Alternatively, this signal level may be visibly monitored based upon an electric field strength of such a signal which is displayed by a received signal strength indicator (RSSI). As explained above, the variable attenuating unit adjusts the signal level of the duplicated loop signal in such a manner that the signal level of the output of the subtracting unit, which is measured by the signal level measuring unit, becomes a predetermined signal level. As a result, the loop waves contained in the received input signal can be firmly removed, and the transmission qualities can be maintained under better conditions.

Also, in the relay apparatus, the signal level measuring unit measures the signal level of the output of the subtracting unit, and the variable phase unit adjusts the phase of the duplicated loop signal in such a manner that the signal level of the output of the subtracting unit, which is measured by the signal level measuring unit, becomes a predetermined signal level.

As explained above, the variable phase shifting unit adjusts the phase of the duplicated loop signal in such a manner that the signal level of the output of the subtracting unit, which is measured by the signal level measuring unit (referring to spectrum waveform and RSSI) becomes a predetermined signal level. As a result, the loop waves contained in the received input signal can be firmly removed, and the transmission qualities can be maintained under better conditions.

Also, in the relay apparatus, the receiving/demodulating unit receives the broadcasting signal outputted from the relay broadcasting unit and demodulates the received broadcasting signal and the error rate measuring unit measures the error rate of the broadcasting signal which is demodulated by the receiving/demodulating unit; and also, the variable attenuating unit adjusts the signal level of the duplicated loop signal in such a manner that the error rate of the broadcasting signal measured by the error rate measuring unit becomes lower than, or equal to a predetermined value.

As described above, based upon the error rate of the broadcasting signal measured by the error rate measuring unit, the variable attenuation unit adjusts the signal level of the duplicated loop signal in such a manner that this error rate becomes lower than, or equal to a predetermined value (concretely speaking, when error rate is measured based upon bit error rate, bit error rate becomes smaller than, or equal to $10^{-6}$). As a result, the loop waves contained in the received input signal can be firmly removed, and the transmission qualities can be maintained under better conditions.

Further, in the relay apparatus, the receiving/demodulating unit receives the broadcasting signal outputted from the relay broadcasting unit and demodulates the received broadcasting signal, the error rate measuring unit measures the error rate of the broadcasting signal which is demodulated by the receiving/demodulating unit; and the variable phase unit adjusts the phase of the duplicated loop signal in such a manner that the error rate of the broadcasting signal measured by the error rate measuring unit becomes lower than, or equal to a predetermined value.

As described above, based upon the error rate of the broadcasting signal measured by the error rate measuring unit, the variable phase unit adjusts the phase of the duplicated loop signal in such a manner that this error rate becomes lower than, or equal to a predetermined value (concretely speaking, when error rate is measured based upon bit error rate, bit error rate becomes smaller than, or equal to $10^{-6}$) As a result, the loop waves contained in the received input signal can be firmly removed, and the transmission qualities can be maintained under better conditions.

DETAILED DESCRIPTION OF THE PREFERRED EMBODIMENTS

Next, relay apparatus according to various preferred embodiments of the present invention will now be described in detail with reference to drawings in this order of first embodiment and second embodiment.

Embodiment 1

Figure 1:
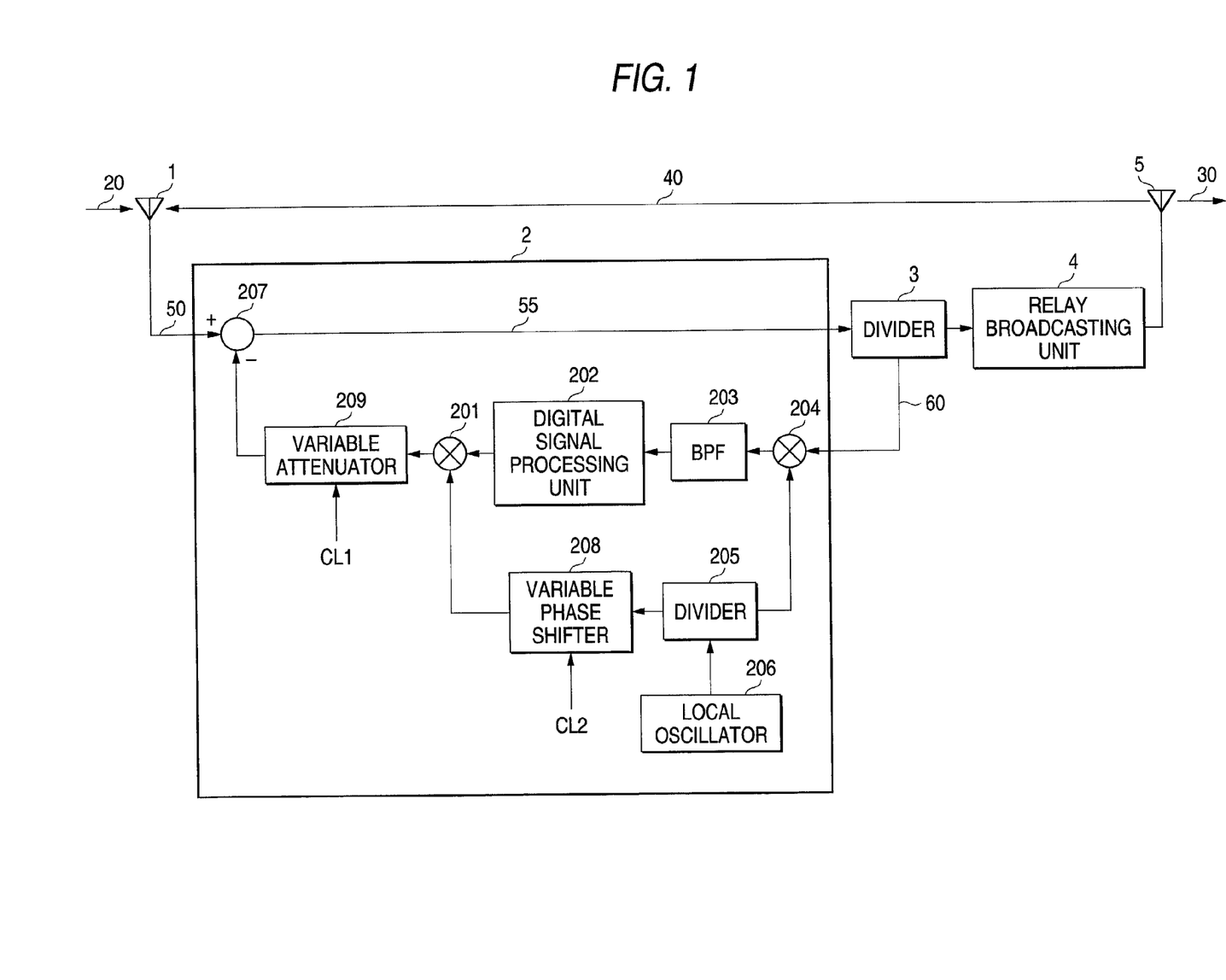
FIG. 1 is a structural diagram for indicating a relay apparatus according to a first embodiment of the present invention.

FIG. 1 is a structural diagram of a relay apparatus according to a first embodiment of the present invention. In this drawing, a relay apparatus according to this first embodiment is equipped with a function capable of canceling loop operations of signals between a reception antenna 1 and a transmission antenna 5. The relay apparatus includes a loop canceller 2, a divider 3, and a relay broadcasting unit 4. The loop canceller 2 subtracts a duplicated loop signal from a received input signal 50 which is produced by containing a loop wave 40 in a desirable wave 20 received via the reception antenna 1 in order to cancel the loop wave 40 derived from the transmission antenna 5. The divider 3 divides a signal outputted from the loop canceller 2. The relay broadcasting unit 4 enters therein a signal outputted from the loop canceller 2 and outputs a broadcasting signal. In this case, the loop canceller 2 is arranged by an up mixer 201, a digital signal processing unit 202, a bandpass filter (BPF) 203, a down mixer 204, a divider 205, a local oscillator 206, a subtracter 207, a variable phase shifter 208, and a variable attenuator 209.

The divider 3 divides the signal outputted from the loop canceller 2 into a input signal of the relay broadcasting unit 4 and a reference signal 60 inputted to the loop canceller 2.

The relay broadcasting unit 4 amplifies such a signal to output the amplified signal, and includes a power amplifier and the like. This signal is outputted from the loop canceller 2, and then, is supplied via the divider 3 to the relay broadcasting unit 4.

Next, an arrangement of the loop canceller 2 will now be explained.

To a (+) input terminal of this subtracter 207, the received input signal 50 is entered, and includes the loop wave 40 derived from the transmission antenna 5 in the desirable wave 20 received via the reception antenna 1. To a (−) input signal of the subtracter 207, a duplicated loop signal is entered and is produced by the digital signal processing unit 202 based upon the reference signal 60 divided by the divider 3. As a consequence, the signal 55 outputted from the subtracter 207 is obtained by subtracting the duplicated loop signal from the received input signal 50.

The local oscillator 206 is employed to produce a local oscillation frequency signal.

The divider 205 is provided to divide a local oscillation frequency signal produced by the local oscillator 206.

The down mixer 204 mixes the reference signal 60 divided by the divider 3 with one local oscillation frequency signal which is produced by the local oscillator 206 and then is divided by the divider 205 so as to frequency-convert this local oscillation frequency signal into an intermediate frequency signal.

The bandpass filter 203 is employed to band-limit an unwanted frequency component based upon a predetermined bandwidth so as to remove this unwanted frequency component. This unwanted frequency component is produced by the frequency converting operation by the down mixer 204.

The digital signal processing unit 202 produces the duplicated loop signal based upon the reference signal 60 which is divided by the divider 3 and then, is frequency-converted by the down mixer 204. It should be noted that a detailed producing operation of such a duplicated loop signal is described in Japanese Patent Publication No. Hei 11-355160.

The up mixer 201 mixes the duplicated loop signal which is produced in the digital signal processing unit 202 with the other local oscillation frequency signal produced in the local oscillator 206 and divided by the divider 205 so as to frequency-convert the duplicated loop signal into a wireless frequency signal (radio frequency signal).

The variable attenuator 209 varies the signal level of the duplicated loop signal which is produced by the digital signal processing unit 202, based upon a first control signal CL1. The variable attenuator 209 may be realized by a pin diode and the like. In the variable attenuator 209 constructed of such a pin diode, while a signal is supplied to the pin diode along the forward direction, the control voltage (namely, first control signal CL1) applied to the pin diode, so that the output level of this pin diode can be controlled. The variable phase shifter 208 varies the phase of the local oscillation frequency signal produced from the local oscillator 206, based upon a second control signal CL2, so that the phase of the duplicated loop signal which is produced in the digital signal processing unit 201 can be varied.

Figure 2:
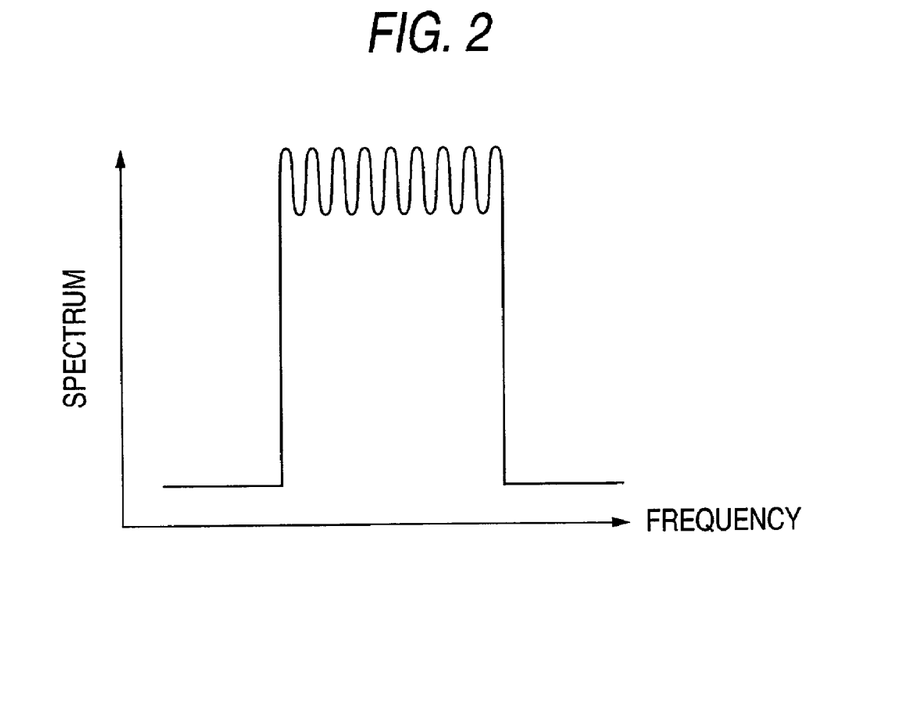
FIG. 2 is an explanatory diagram for explaining a spectrum waveform of an output signal from a subtracter.
Figure 3:
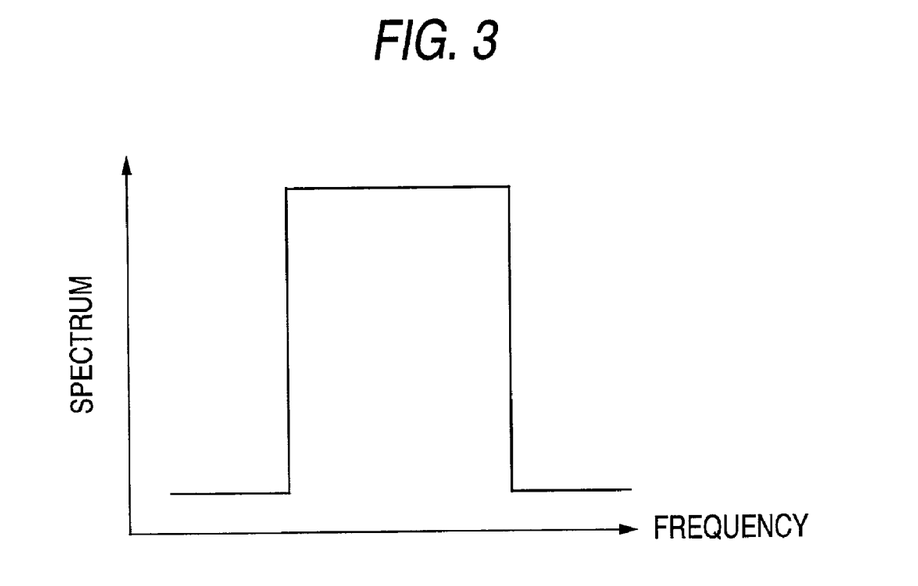
FIG. 3 is an explanatory diagram for representing a spectrum waveform of a desirable wave received by a reception antenna.

Next, cancellation operation of the relay apparatus providing with the above-explained structural elements will now be explained with reference to FIG. 1, FIG. 2, and FIG. 3, namely, loop operations of the loop signals between the reception antenna 1 and the transmission antenna 5 are canceled by this relay apparatus. FIG. 2 is an explanatory diagram for representing a spectrum waveform of the output signal 55 of the subtracter 207. Also, FIG. 3 is an explanatory diagram for showing a spectrum waveform of a desirable wave 20 received by the reception antenna 1.

First, the received input signal 50 is inputted into the (+) input terminal of the subtracter 207. This received input signal 50 includes the loop wave 40 in the desirable wave 20 received via the reception antenna 1. Next, the reference signal 60 is entered into the down mixer 204, and is derived by dividing the output 55 of the subtracter 207 by the divider 3. In the down mixer 204, one local oscillation frequency signal is mixed with the reference signal 60 so as to be frequency-converted into the intermediate frequency signal. This local oscillation frequency signal is produced by the local oscillator 206 and then, is divided by the divider 205. Then, the output signal from the down mixer 204 is filtered by the bandpass filter 203 so as to remove the unwanted frequency component therefrom, and then, the filtered intermediate frequency signal is inputted into the digital signal processing unit 202. In the digital signal processing unit 202, the duplicated loop signal is produced based upon the entered intermediate frequency signal from the bandpass filter 203. Then, this duplicated loop signal which is produced in the digital signal processing unit 202 is inputted into the up mixer 201. In this mixer 201, the duplicated loop signal from the digital signal processing unit 202 is mixed with the other local oscillation frequency signal which is produced by the local oscillator 206 and is divided by the divider 205 so as to be frequency-converted into the wireless frequency signal.

Then, the variable phase shifter 208 arranged between the divider 205 and the up mixer 201 varies a phase of the local oscillation signal entered into the up mixer 201. In this case, concrete control operation of this variable phase shifter 208 will now be explained. That is, while an operator visibly monitors a spectrum waveform shape (see FIG. 2) of the output signal 55 of the subtracter 207, which is displayed on an output unit (not shown), the operator manually controls the variable phase shifter 208 by employing the second control signal CL2 in such a manner that the shape (see FIG. 2) of the spectrum waveform of the output signal 55 of this subtracter 207 is approximated to the shape (see FIG. 3) of the spectrum waveform of the desirable wave 20, and thus, the phase of the local oscillation frequency signal produced from the local oscillator 206 supplied to the up mixer 201 is varied. As a result, the operator may vary the phase of this local oscillation frequency signal in such a manner that the phase of the duplicated loop signal which is produced by the digital signal processing unit 202 becomes inverse to the phase of the loop wave 40 contained in the received input signal 50.

Next, the duplicated loop signal which is frequency-converted by the up mixer 201 is entered into the variable attenuator 209. In this case, concrete control operation of this variable attenuator 209 will now explained. That is, firstly, while the operator visibly monitors a spectrum waveform shape (see FIG. 2) of the output signal 55 of the subtracter 207, which is displayed on the output unit (not shown), the operator manually controls the variable attenuator 209 by employing the first control signal CL1 in such a manner that the shape (see FIG. 2) of the spectrum waveform of the output signal 55 of this subtracter 207 is approximated to the shape (see FIG. 3) of the spectrum waveform of the desirable wave 20, and thus, the signal level of the output signal from the up mixer 201 is varied.

Then, the output signal of the variable attenuator 209 is entered into the (−) input terminal of the subtracter 207. In the subtracter 207, the duplicated loop signal which is entered into the (−) input terminal of this subtracter 207 and is produced by the digital signal processing unit 202 is subtracted from the received input signal 50 which is entered into the (+) input terminal thereof. In other words, the signals which are adjusted by the variable phase shifter 208 and the variable attenuator 209 are subtracted from the received input terminal 50 in this subtracter 207. As a consequence, the subtracter 207 may output such a signal 55 from which the loop waves contained in the received input signal is firmly canceled.

As previously explained, in accordance with the relay apparatus of this first embodiment, while the operator visibly monitors the shape (see FIG. 2) of the spectrum waveform of the output signal 55 of the subtracter 207, which is displayed on the output unit (not shown), the operator manually controls the variable shape shifter 208 by employing the second control signal CL2 in such a manner that this shape of the spectrum waveform of the output signal 55 of this subtracter 207 is approximated to the shape of the spectrum waveform of the desirable wave 20, and thus, the phase of the local oscillation frequency signal produced from the local oscillator 206 supplied to the up mixer 201 is varied. As a result, the operator may vary the phase of this local oscillation frequency signal in such a manner that the phase of the duplicated loop signal which is produced by the digital signal processing unit 202 becomes inverse to the phase of the loop wave 40 contained in the received input signal 50. Also, while an operator visibly monitors the spectrum waveform shape of the output signal 55 of the subtracter 207, which is displayed on the output unit (not shown), the operator manually controls the variable attenuator 209 by employing the first control signal CL1 in such a manner that the shape of the spectrum waveform of the output signal 55 of this subtracter 207 is approximated to the shape of the spectrum waveform of the desirable wave 20, and thus, the signal level of the duplicated loop signal which is produced in the digital signal processing unit 202 may be changed. As a consequence, while the relay apparatus corrects both the phase error and the amplitude error of the duplicated loop signal, which are caused by the quantization error, the delay of the signal processing operation in the digital signal processing unit 202, and other factors, the loop operations of the signals between the transmission antenna 5 and the reception antenna 1 can be firmly canceled, and furthermore, the transmission qualities can be maintained under better condition.

Figure 4:
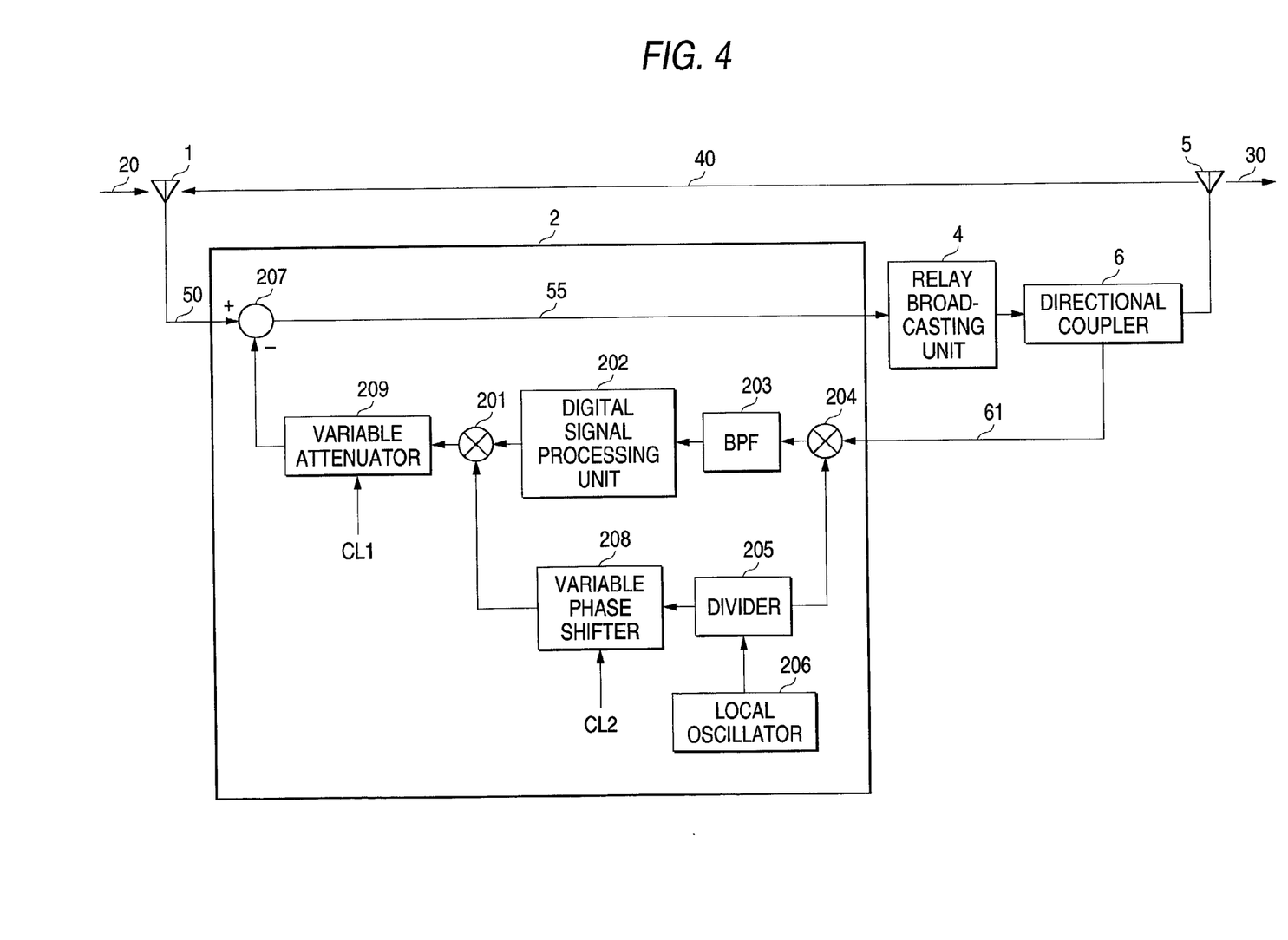
FIG. 4 is a structural diagram for representing a modification of the delay apparatus according to the first embodiment.

Also, in the first embodiment, as indicated in FIG. 1, the output signal 55 of the subtracter 207 is divided by the divider 3, and then, the reference signal 60 derived from this divider 3 is entered into the down mixer 204. Alternatively, as shown in FIG. 4, while the output signal 55 of the subtracter 207 is entered into the relay broadcasting unit 4, another reference signal 61 may be branched from the output signal of this relay broadcasting unit 4 by a directional coupler 6 to be entered into the down mixer 204. It should be noted that functions of structural elements shown in FIG. 4 to which the same reference numerals as those of FIG. 1 are equivalent to those of the structural elements shown in FIG. 1.

In the above-explained first embodiment, the variable phase shifter 208 is arranged between the divider 205 and the up mixer 201 in FIGS. 1 and 4. Alternatively, this variable phase shifter 208 may be arranged between the divider 205 and the down mixer 204. Also, two variable phase shifters 208 may be arranged both between the divider 205 and the up mixer 201, and between the divider 205 and the down mixer 204. Then, any one of the phase of the local oscillation frequency signal which is supplied from the local oscillator 206 to the up mixer 201, and the phase of the local oscillation frequency signal which is supplied from the local oscillator 206 to the down mixer 605 may be varied by the variable phase shifter 208. Also, both of the above-described phases may be varied by the variable phase shifter 208.

Embodiment 2

Figure 5:
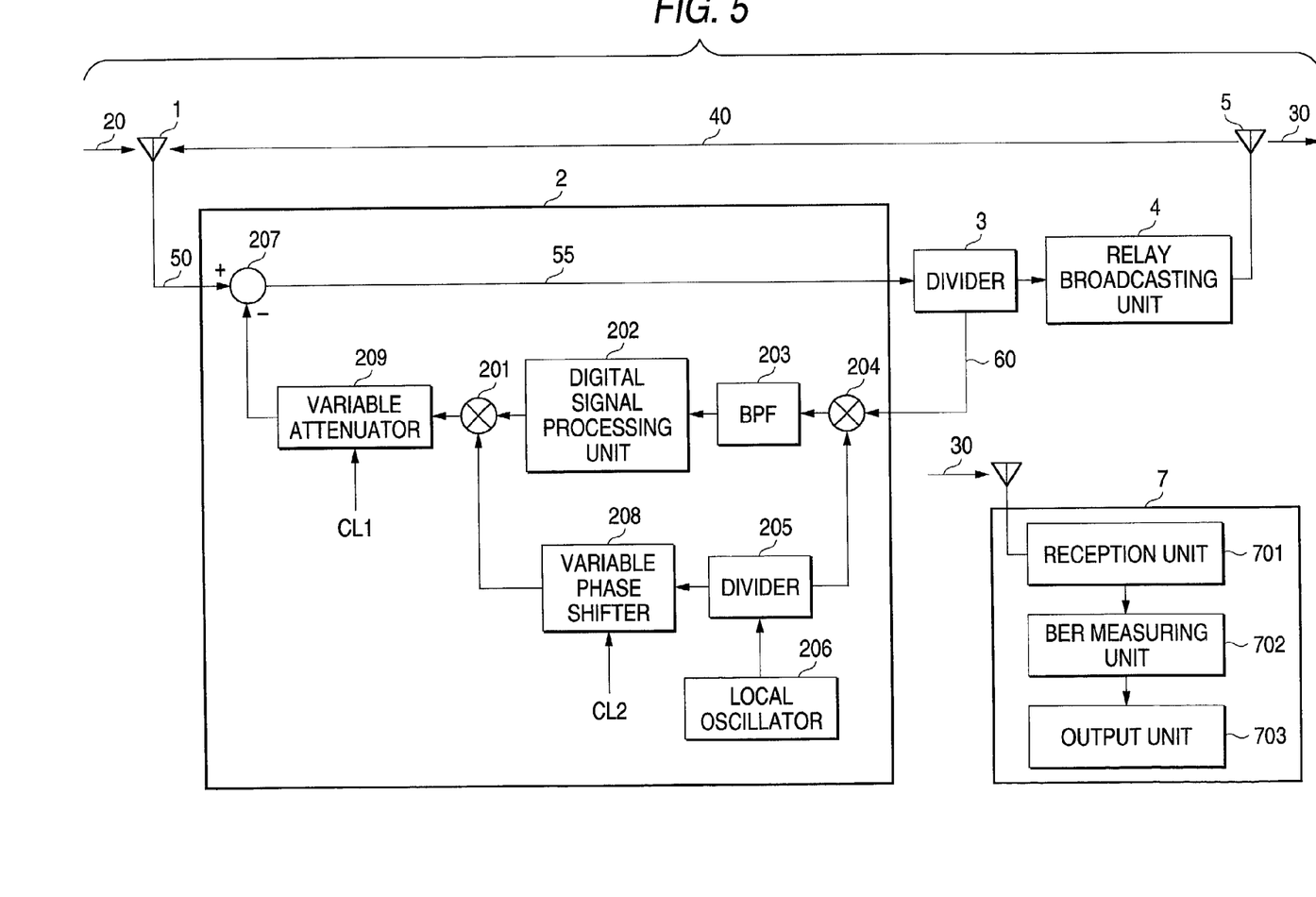
FIG. 5 is a structural diagram for showing a relay apparatus according to a second embodiment of the present invention.

FIG. 5 is a structural diagram for indicating a relay apparatus according to a second embodiment of the present invention. In this drawing, the arrangement of the relay apparatus according this second embodiment is realized by adding a BER (Bit Error Rate) measuring apparatus 7 for measuring a bit error rate (BER) of a broadcasting wave 30 to the arrangement (see FIG. 1) of the relay apparatus as explained in the first embodiment. In this case, the BER measuring apparatus 7 is arranged by a reception unit 701, a BER measuring unit 702, and an output unit 703.

Next, the BER measuring apparatus 7 indicated in FIG. 5 will now be explained. In this drawing, it should be noted that since the same structural elements as those of FIG. 1 own the similar functions thereof, the same reference numerals are applied thereto, and therefore, explanations thereof are omitted.

The reception unit 701 receives the broadcasting wave 30 via a reception antenna 1, and then, remodulates the received broadcasting wave 30.

The BER measuring unit 702 measures a BER of a broadcasting signal which is received/demodulated by the reception unit 701.

Furthermore, the output unit 703 displays thereon the BER measured in the BER measuring unit.

Referring now to FIG. 5, a description will be made of operation capable of canceling loop operations of signals occurred between the reception antenna 1 and the transmission antenna 5 in the relay apparatus equipped with the above-explained structural elements, according to this second embodiment.

This second embodiment is realized by employing the BER measuring apparatus 7 in addition to the arrangement of the relay apparatus according to the first embodiment. In this relay apparatus, the variable attenuator 209 is manually controlled by supplying the first control signal CL1 based upon a BER of a broadcasting signal displayed on the output unit 703 of this BER measuring apparatus 7, and also, the variable phase shifter 208 is manually controlled by supplying the second control signal CL2.

In the BER measuring apparatus 7, the broadcasting wave 30 is firstly received via the reception antenna 1 and then is demodulated by the reception unit 701. This demodulated broadcasting signal is entered into the BER measuring unit 702 so as to measure a BER (bit error rate) of the broadcasting signal. Then, this BER of the measured broadcasting signal is displayed on the output unit 703.

Concretely speaking, firstly, while an operator manually controls the variable phase shifter 208 by employing the second control signal CL2 based upon the BER of the broadcasting signal displayed on the output unit 703 of the BER measuring apparatus 7 in such a manner that this BER of the broadcasting signal becomes lower than, or equal to a predetermined value (for instance, generally speaking, BER becomes lower than, or equal to $10^{-6}$ which is defined as error rate of communication line), a phase of a duplicated loop signal is varied to be adjusted by changing the phase of the local oscillation frequency signal produced from the local oscillator 206, which is supplied to the up mixer 201, in order that a phase error of the duplicated loop signal produced in the digital signal processing unit 202 is corrected. Similarly, while the operator manually controls the variable attenuator 209 by employing the first control signal CL1 based upon the BER of the broadcasting signal displayed on the output unit 703 of the BER measuring apparatus 7 in such a manner that this BER of the broadcasting signal becomes lower than, or equal to a predetermined value, a signal level of an output signal from the up mixer 201 is changed to be adjusted so as to correct an amplitude error of a duplicated loop signal which is produced in the digital signal processing unit 202.

As previously explained, in the relay apparatus according to this second embodiment, the variable attenuator 209 is manually controlled by supplying the first control signal CL1 based upon the BER of the broadcasting signal obtained from the BER measuring apparatus 7, in order that the signal level of the duplicated loop signal outputted from the digital signal processing unit 202 is varied. Similarly, the variable phase shifter 208 is manually controlled by supplying the second control signal CL2 based upon the BER of the broadcasting signal employed from the BER measuring apparatus 7, in order that the phase of the duplicated loop signal outputted from the digital signal processing unit 202 is varied. As a result, the relay apparatus can correct both the amplitude error and the phase error, which are caused by the quantizying error, the delay of the signal process operation in the digital signal processing unit 202, and other factors, so that the loop operations of the signals between the transmission antenna 5 and the reception antenna 1 can be firmly canceled, and the transmission qualities can be maintained under better condition.

Alternatively, the control operation executed based upon the spectrum waveform of the reference signal 60 displayed on the output unit (not shown) as explained in the first embodiment may be combined with the control operation executed based on the BER of the broadcasting signal measured by the BER measuring apparatus 7. Also, similar to the first embodiment, in this second embodiment, while the output signal 55 of the subtracter 207 is divided by the divider 3, as indicated in FIG. 4, the output signal 55 of this subtracter 207 may be entered into the relay broadcasting unit 4, and also, the reference signal 61 may be branched by the directional coupler 6 from the output signal of this relay broadcasting unit 4 so as to input this reference signal 61 into the down mixer 204, although the reference signal 60 derived from the divider 3 is not entered into the down mixer 204.

It should also be understood that the present invention is not limited to the above-explained embodiment, and therefore, both the control method of the variable attenuator and the control method of the variable phase shifter may be modified without departing from the technical scope and the technical spirit of the present invention.

As previously described, in the relay apparatus of the present invention, based upon any one of the input and the output of the relay broadcasting unit which inputs the output of the subtracting unit and outputs the broadcasting signal, the signal processing unit produces the duplicated loop signal, and the subtracting unit subtracts this duplicated loop signal which is produced by the signal processing unit, from the received input signal which is obtained by containing the loop signal in the desirable wave received via the reception antenna. At this time, since the variable attenuating unit changes/adjusts the signal level of this duplicated loop signal in such a manner that the amplitude error of the duplicated loop signal which is produced by the signal processing unit is corrected may be corrected, the loop wave contained in the received input signal can be firmly removed, and also, the transmission quantities can be maintained under better condition.

Also, in accordance with the relay apparatus of the present invention, based upon any one of the input and the output of the relay broadcasting unit which inputs the output of the subtracting unit and outputs the broadcasting signal, the signal processing unit produces the duplicated loop signal, and subsequently, the subtracting unit subtracts this duplicated loop signal which is produced by the signal processing unit, from the received input signal which is obtained by containing the loop signal in the desirable wave received via the reception antenna. At this time, since the variable phase shifting unit changes/adjusts the phase of this duplicated loop signal in such a manner that the phase error of the duplicated loop signal which is produced by the signal processing unit is corrected may be corrected, the loop wave contained in the received input signal can be firmly removed, and also, the transmission quantities can be maintained under better condition.

Also, in accordance with the relay apparatus of the present invention, since either the variable attenuating unit or the variable phase shifting signal level or the phase of the duplicated loop signal in such a manner that the signal level of the output signal from the subtracting unit, which is measured by the signal level measuring unit, may become a predetermined signal level, the loop wave contained in the received input signal can be firmly removed and also the transmission qualities can be maintained under better condition.

Furthermore, in accordance with the relay apparatus of the present invention, since either the variable attenuating unit or the variable phase shifting unit adjusts either the signal level or the phase of the duplicated loop signal in such a manner that the error rate of the broadcasting signal measured by the error rate measuring unit may become lower than, or equal to a predetermined value, loop wave contained in the received input signal can be firmly removed and also the transmission qualities can be maintained under better condition.

What is claimed is:

1. A relay apparatus equipped with a function capable of canceling loop operation of a signal between a reception antenna and a transmission antenna, comprising:
    a subtracting unit for subtracting a duplicated loop signal from a received input signal which is produced by containing loop waves in a desirable wave received via said reception antenna;
    a relay broadcasting unit for inputting the output signal of said subtracting unit and for outputting a broadcasting signal;
    a signal processing unit for producing said duplicated loop signal based upon any one of the input signal of said relay broadcasting unit and the broadcasting signal outputted from said relay broadcasting unit;
    a variable phase shifting unit for varying a phase of said duplicated loop signal which is produced by said signal processing unit;
    a local oscillation unit for producing a local oscillation frequency signal;
    a dividing unit for dividing said local oscillation frequency signal;

a first frequency converting unit for frequency-converting any one of the wireless frequency signals corresponding to the input signal and the output signal of said relay broadcasting unit into an intermediate frequency signal by using one of said local oscillation frequency signals divided by said dividing unit; and a second frequency converting unit for frequency-converting said duplicated loop signal which is produced by said signal processing unit into a wireless frequency signal by using the other local oscillation frequency signal divided by said dividing unit, wherein a said variable phase shifting unit adjusts the phase of said duplicated loop signal so that a phase error of said duplicated loop signal is corrected, and wherein said variable phase unit is connected to any one output side, or both output sides of said dividing unit.

2. A relay apparatus equipped with a function capable of canceling loop operation of a signal between a reception antenna and a transmission antenna, comprising:

a subtracting unit for subtracting a duplicated loop signal from a received input signal which includes loop waves in a desirable wave received via said reception antenna;

a relay broadcasting unit for inputting the output signal of said subtracting unit and for outputting a broadcasting signal;

a signal processing unit for producing said duplicated loop signal based upon any one of the input signal of said relay broadcasting unit and the broadcasting signal outputted from said relay broadcasting unit;

a variable attenuating unit for varying a signal level of said duplicated loop signal which is produced by said signal processing unit; and a signal level measuring unit for measuring a signal level of the output of said subtracting unit, wherein said variable attenuating unit adjusts the signal level of said duplicated loop signal so that an amplitude error of said duplicated loop signal is corrected, and wherein said variable attenuating unit adjusts the signal level of said duplicated loop signal so that the signal level of the output of said subtracting unit, which is measured by said signal level measuring unit, becomes a predetermined signal level.

3. A relay apparatus equipped with a function capable of canceling loop operation of a signal between a reception antenna and a transmission antenna, comprising:

a subtracting unit for subtracting a duplicated loop signal from a received input signal which is produced by containing loop waves in a desirable wave received via said reception antenna;

a relay broadcasting unit for inputting the output signal of said subtracting unit and for outputting a broadcasting signal;

a signal processing unit for producing said duplicated loop signal based upon any one of the input signal of said relay broadcasting unit and the broadcasting signal outputted from said relay broadcasting unit;

a variable phase shifting unit for varying a phase of said duplicated loop signal which is produced by said signal processing unit;

a signal level measuring unit for measuring a signal level of the output of said subtracting unit, wherein a said variable phase shifting unit adjusts the phase of said duplicated loop signal so that a phase error of said duplicated loop signal is corrected, and wherein said variable phase shifting unit adjusts the phase of said duplicated loop signal in such a manner that the signal level of the output of said subtracting unit, which is measured by said signal level measuring unit, becomes a predetermined signal level.

4. A relay apparatus equipped with a function capable of canceling loop operation of a signal between a reception antenna and a transmission antenna, comprising:

a subtracting unit for subtracting a duplicated loop signal from a received input signal which includes loop waves in a desirable wave received via said reception antenna;

a relay broadcasting unit for inputting the output signal of said subtracting unit and for outputting a broadcasting signal;

a signal processing unit for producing said duplicated loop signal based upon any one of the input signal of said relay broadcasting unit and the broadcasting signal outputted from said relay broadcasting unit;

a variable attenuating unit for varying a signal level of said duplicated loop signal which is produced by said signal processing unit;

a receiving/demodulating unit for receiving said broadcasting signal outputted from said relay broadcasting unit and for demodulating said received broadcasting signal; and an error rate measuring unit for measuring an error rate of said broadcasting signal which is demodulated by said receiving/demodulating unit, wherein said variable attenuating unit adjusts the signal level of said duplicated loop signal so that an amplitude error of said duplicated loop signal is corrected, and wherein said variable attenuating unit adjusts the signal level of said duplicated loop signal in such a manner that the error rate of said broadcasting signal measured by said error rate measuring unit becomes lower than, or equal to a predetermined value.

5. A relay apparatus equipped with a function capable of canceling loop operation of a signal between a reception antenna and a transmission antenna, comprising:

a subtracting unit for subtracting a duplicated loop signal from a received input signal which is produced by containing loop waves in a desirable wave received via said reception antenna;

a relay broadcasting unit for inputting the output signal of said subtracting unit and for outputting a broadcasting signal;

a signal processing unit for producing said duplicated loop signal based upon any one of the input signal of said relay broadcasting unit and the broadcasting signal outputted from said relay broadcasting unit;

a variable chase shifting unit for varying a phase of said duplicated loop signal which is produced by said signal processing unit;

a receiving/demodulating unit for receiving said broadcasting signal outputted from said relay broadcasting unit and for demodulating said received broadcasting signal; and an error rate measuring unit for measuring an error rate of said broadcasting signal which is demodulated by said receiving/demodulating unit, wherein a said variable chase shifting unit adjusts the phase of said duplicated loop signal so that a phase error of said duplicated loop signal is corrected, and wherein said variable phase shifting unit adjusts the phase of said duplicated loop signal in such a manner that the error rate of said broadcasting signal measured by said error rate measuring unit becomes lower than, or equal to a predetermined value.

* * * * *

UNITED STATES PATENT AND TRADEMARK OFFICE
CERTIFICATE OF CORRECTION

PATENT NO.        : 7,046,960 B2                                              Page 1 of 1
APPLICATION NO. : 10/001759
DATED             : May 16, 2006
INVENTOR(S)       : Takemoto et al.

It is certified that error appears in the above-identified patent and that said Letters Patent is hereby corrected as shown below:

In Column 2, line 53, please delete "are lay" and insert --a relay--

In Column 14, line 48, please delete "chase" and insert --phase--

In Column 14, line 58, please delete "chase" and insert --phase--.

Signed and Sealed this

Seventh Day of November, 2006

JON W. DUDAS
*Director of the United States Patent and Trademark Office*